(12) United States Patent
Neerudu et al.

(10) Patent No.: US 7,298,772 B1
(45) Date of Patent: Nov. 20, 2007

(54) PACKET DETECTION, SYMBOL TIMING, AND COARSE FREQUENCY ESTIMATION IN AN OFDM COMMUNICATIONS SYSTEM

(75) Inventors: Ravikumar Neerudu, Khammam (IN); Narasimhan Venkatesh, Hyberabad (IN); Ponnamanda Venkata Chandra Sekhar, Hyderabad (IN)

(73) Assignee: Redpine Signals, Inc., San Jose, CA (US)

( * ) Notice: Subject to any disclaimer, the term of this patent is extended or adjusted under 35 U.S.C. 154(b) by 615 days.

(21) Appl. No.: 10/934,276

(22) Filed: Sep. 3, 2004

(51) Int. Cl.
*H04B 1/00* (2006.01)

(52) U.S. Cl. .................. 375/136; 375/260; 375/355

(58) Field of Classification Search ............. 375/136, 375/260, 355
See application file for complete search history.

(56) References Cited

U.S. PATENT DOCUMENTS

| | | | |
|---|---|---|---|
| 5,732,113 A | 3/1998 | Schmidl et al. | |
| 5,889,759 A | 3/1999 | McGibney | |
| 6,021,110 A | 2/2000 | McGibney | |
| 6,151,295 A | 11/2000 | Ma et al. | |
| 6,320,915 B1 * | 11/2001 | Stott et al. | 375/340 |
| 6,363,084 B1 * | 3/2002 | Dejonghe | 370/480 |
| 6,381,263 B1 | 4/2002 | Suzuki | |
| 6,459,679 B1 | 10/2002 | Kim | |
| 6,539,063 B1 | 3/2003 | Peyla et al. | |
| 6,628,606 B1 | 9/2003 | Hong et al. | |
| 6,658,063 B1 * | 12/2003 | Mizoguchi et al. | 375/260 |
| 6,675,012 B2 | 1/2004 | Gray | |
| 6,700,866 B1 | 3/2004 | Heinonen et al. | |
| 6,754,170 B1 | 6/2004 | Ward | |
| 7,203,245 B1 * | 4/2007 | Murphy | 375/260 |

* cited by examiner

*Primary Examiner*—David C. Payne
*Assistant Examiner*—Rahel Guarino
(74) *Attorney, Agent, or Firm*—Jay A. Chesavage (57) ABSTRACT

A integrated system for generation of packet detection, symbol timing, and coarse frequency offset for an orthogonal frequency division multiplexed (OFDM) receiver having a stream of input symbols applied comprises a first multiplier performing a multiplication on a delayed and conjugated stream of input symbols multiplied by the input symbol stream. The output of the first multiplier is summed over a symbol length. A second multiplier has an output formed from multiplying the delayed symbol stream by its conjugate, thereby providing a signal strength term Pn. The output of the second multiplier is summed over two symbol periods, and multiplied by a known threshold to form a threshold value. When the magnitude of cn term rises above the known threshold, this generates a packet detect output, and when the magnitude of Cn terms thereafter falls below the known threshold, this generates a symbol timing output.

34 Claims, 6 Drawing Sheets

Figure 2
Packet Detection &
Coarse Frequency Offset
Prior Art

*Figure 3*
Symbol Timing
Prior Art

Figure 4
Packet Detection

Figure 5

PACKET DETECTION, SYMBOL TIMING, AND COARSE FREQUENCY ESTIMATION IN AN OFDM COMMUNICATIONS SYSTEM

FIELD OF THE INVENTION

The present invention is related to wireless systems for receiving data, including Orthogonal Frequency Division Multiplexed (OFDM) wireless systems, as described in IEEE standard 802.11a and 802.11g.

BACKGROUND OF THE INVENTION

On an OFDM system, symbols are transmitted using a plurality of simultaneous windowed sinusoidal sources operating over a series of regular time intervals, typically 3.2 us in duration, with a gap between symbols of 0.8 us to allow for separation between individual OFDM symbols. Transmission of data using OFDM modulation provides intrinisic resistance to multipath reflection at the receiver by virtue of using a plurality of subcarriers within each symbol such that each symbol carries a large amount of information in the form of a large plurality of subcarrier pilots, and each symbol has a temporal duration longer than multi-path reflection. In this manner, multi-path reflections along the communications channel and superimposed at the receiver tend to occur within the duration of a symbol time, and the symbols are separated by a guard band to ensure that bleeding from one symbol into another is minimized. One of the requirements for proper demodulation of OFDM symbols is detection of the packet and synchronization of the local receiver to the stream of symbols, as offsets between the transmitted frequency and local oscillator will result in phase ramps of the demodulated pilots. Packet detection and symbol synchronization are achieved using a short preamble part of the packet comprising a series of short symbols. Coarse adjustment of the local oscillator is achieved during a first preamble time, and fine adjustment is accomplished during a second long preamble time.

Figure 1:
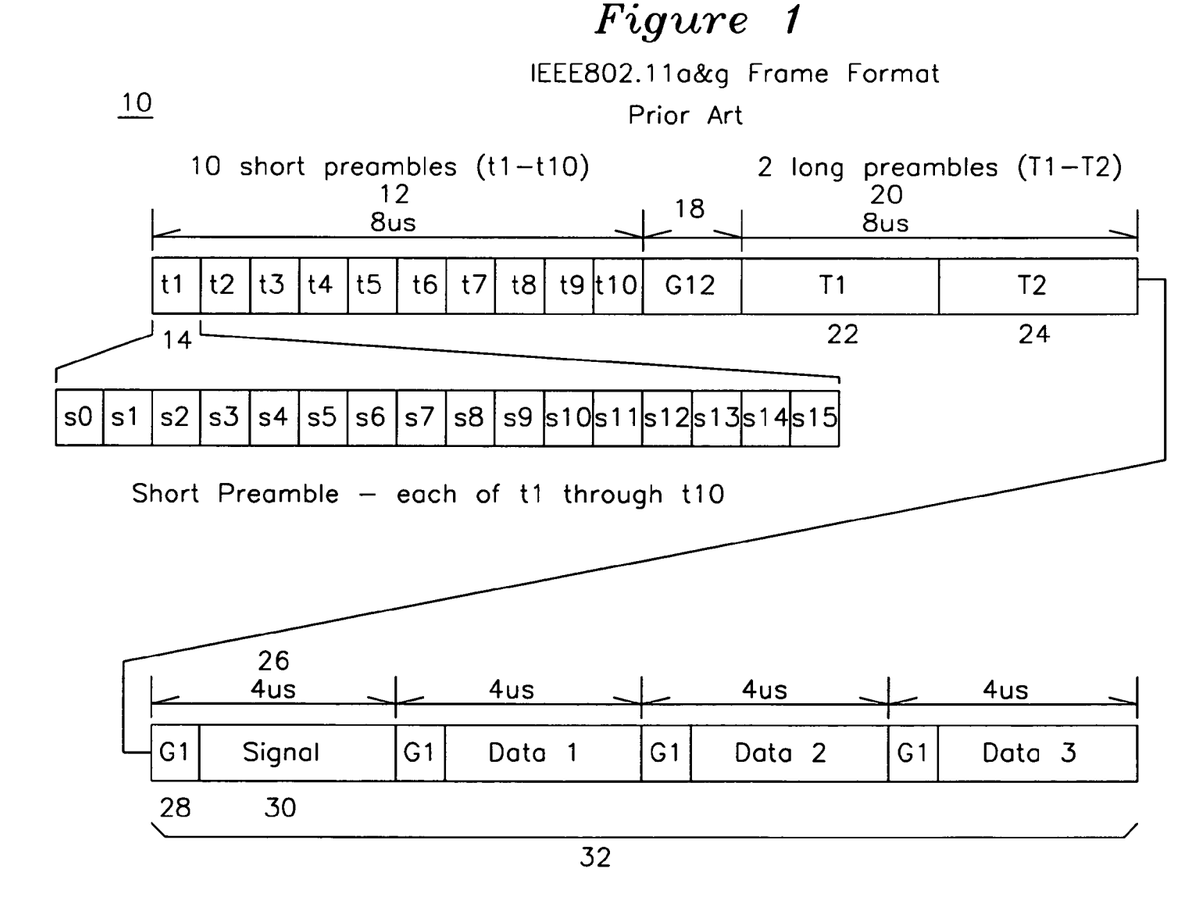
FIG. 1 shows a timing diagram of an IEEE 802.11a or 802.11g packet.

FIG. 1 shows a typical IEEE 802.11a or 802.11g OFDM packet 10 and includes a short preamble section 12 comprising ten identical short symbols shown as t1-t10. One of the short symbol t1 14 is expanded to show that it comprises a pattern of 16 OFDM samples shown as s0 through s15. The first preamble section 12 is used to achieve receiver synchronization whereby the receiver detects the short preamble and initially synchronizes to the repeating pattern t1-t10 of short preamble, each of which is 0.8 us in duration and comprises 16 OFDM samples s0 through s15, as shown for exemplar short symbol t1 14. A packet start output is asserted when the second short symbol is received, and a symbol timing output is asserted upon the passing of the final short symbol t10 of short preamble 12, as will be explained later. The packet detection signal is used to gate the operation of the symbol timing function, and when the symbol timing output is asserted, this signal is used to establish the symbol timing of all subsequent symbols in the packet, including the placement of guard bands to exclude certain areas between OFDM symbols in the data area of the packet. During short preamble section 12, an estimate of coarse frequency offset is made and fed back to the Numerically controller oscillator (NCO) for compensating frequency offset. In this manner, when the symbol timing output is asserted, the coarse frequency correction is completed, thereby allowing the symbol timing output to be more accurate over the rest of the packet. The coarse frequency correction derived from the short preamble is fed back as a first correction to tune the NCO, and during a Long preamble interval, a longer and more accurate estimate of frequency offset is made and fed back to the NCO, as is known to one skilled in the art of wireless receivers. The short preamble section 12 comprising a plurality of short symbols t1 through t10 is followed by a guard band 18 to separate the short preamble and long preamble section, and this is followed by long preamble section 20, which comprises two long symbols, shown as T1 22 and T2 24. The long symbols T1 22 and T2 24 are used to establish a more precise estimate of frequency offset after the initial oscillator adjustment is made based on the short preamble coarse frequency offset measurement.

The functions of packet detection, symbol timing, and coarse frequency offset have been performed by separate or combined circuit functions in the prior art.

U.S. Pat. No. 6,320,915 by Stott et al describes a symbol synchronization system whereby an incoming stream of symbols is delayed and multiplied by the complex conjugate of the incoming stream of symbols, thereby generating a synchronization pulse for further processing. U.S. Pat. No. 6,539,063 by Peyla et al describes a system for recovering symbol timing and carrier frequency error using the product of multiplication of an OFDM symbol stream with a slightly delayed version, thereby extracting symbol synchronization and timing from the energy introduced by shaping the leading and trailing edges of the subcarriers used in OFDM. U.S. Pat. No. 6,658,063 by Mizoguchi et al. describes a symbol timing recovery mechanism for 802.11 OFDM WANs, and includes a coarse frequency offset. U.S. Pat. No. 6,675,012 by Gray describes the use of multiplying a signal with a conjugated version of the signal which has been delayed by one symbol time, thereby providing a means for packet detection.

U.S. Pat. No. 6,363,084 by Dejohnge describes a method for extracting coarse frequency offset by performing an FFT on the same sample point of multiple preamble symbols to detect the offset frequency. U.S. Pat. No. 6,381,263 by Suzuki describes a system for measuring frequency offset in a multi-channel system, and U.S. Pat. No. 6,459,679 by Kim describes a system for extracting frequency offsets in a single channel OFDM system.

Figure 2:
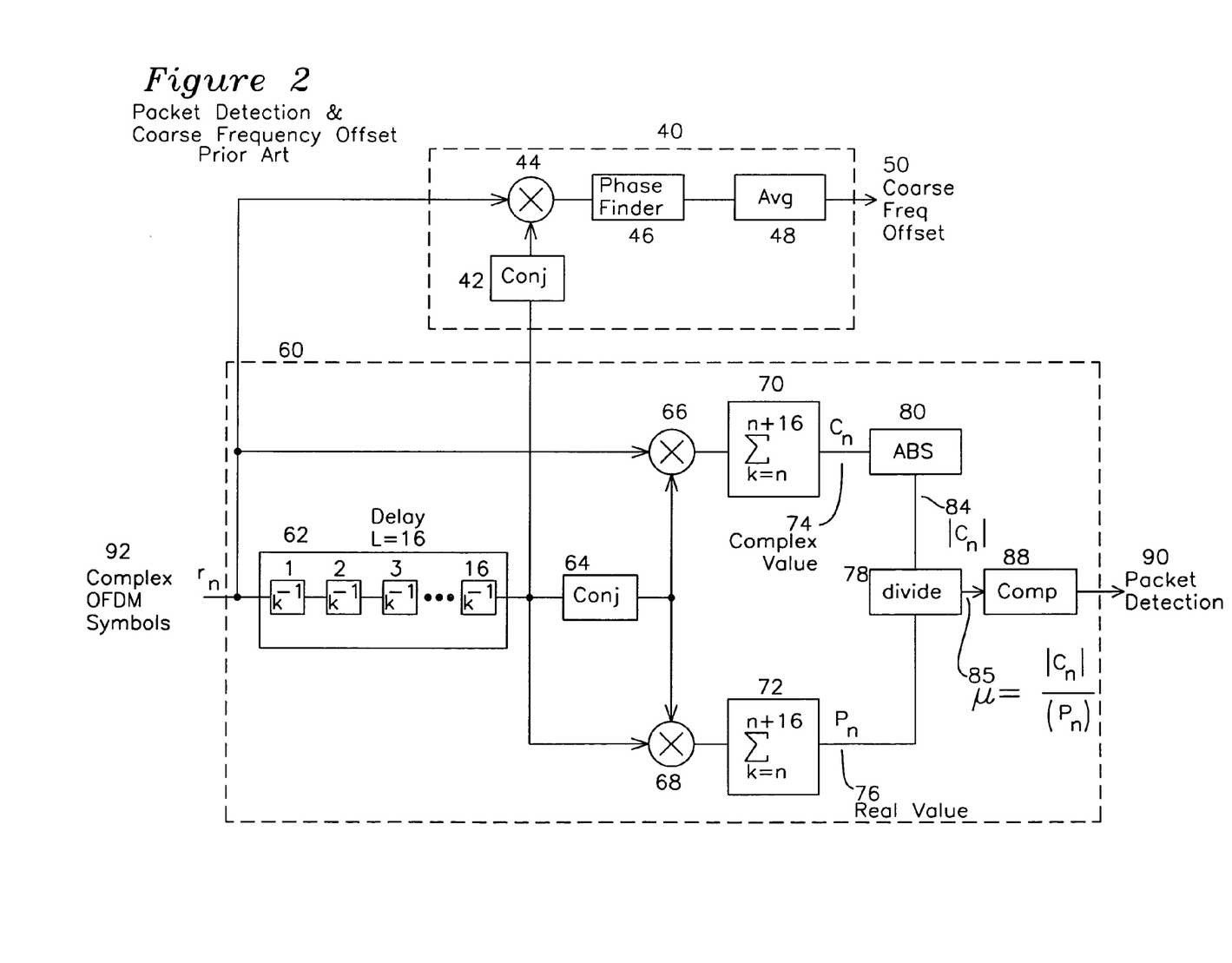
FIG. 2 shows the block diagram for a prior art packet detection system and a coarse frequency offset estimator.
Figure 3:
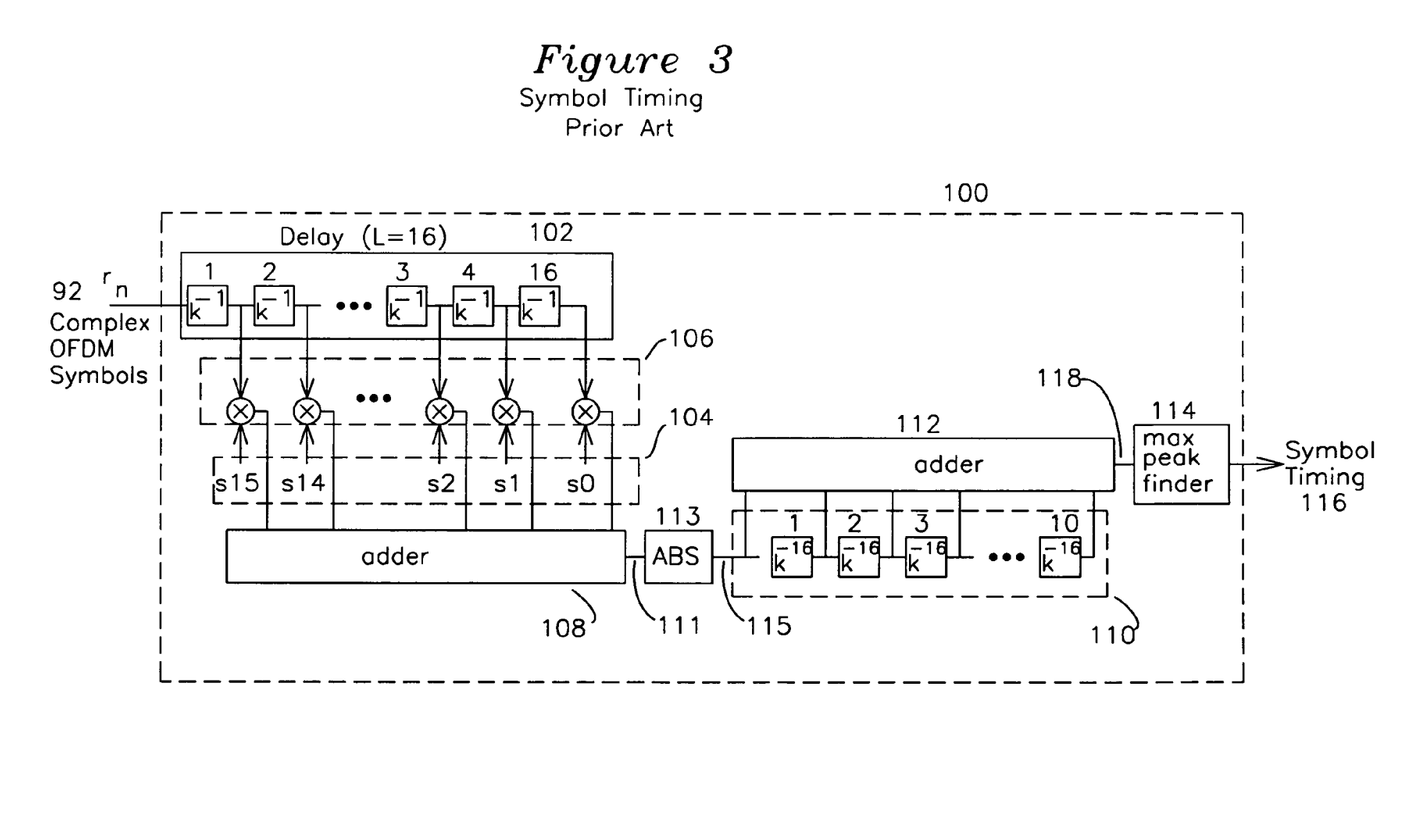
FIG. 3 shows a block diagram for a prior art symbol timing function.
Figure 4:
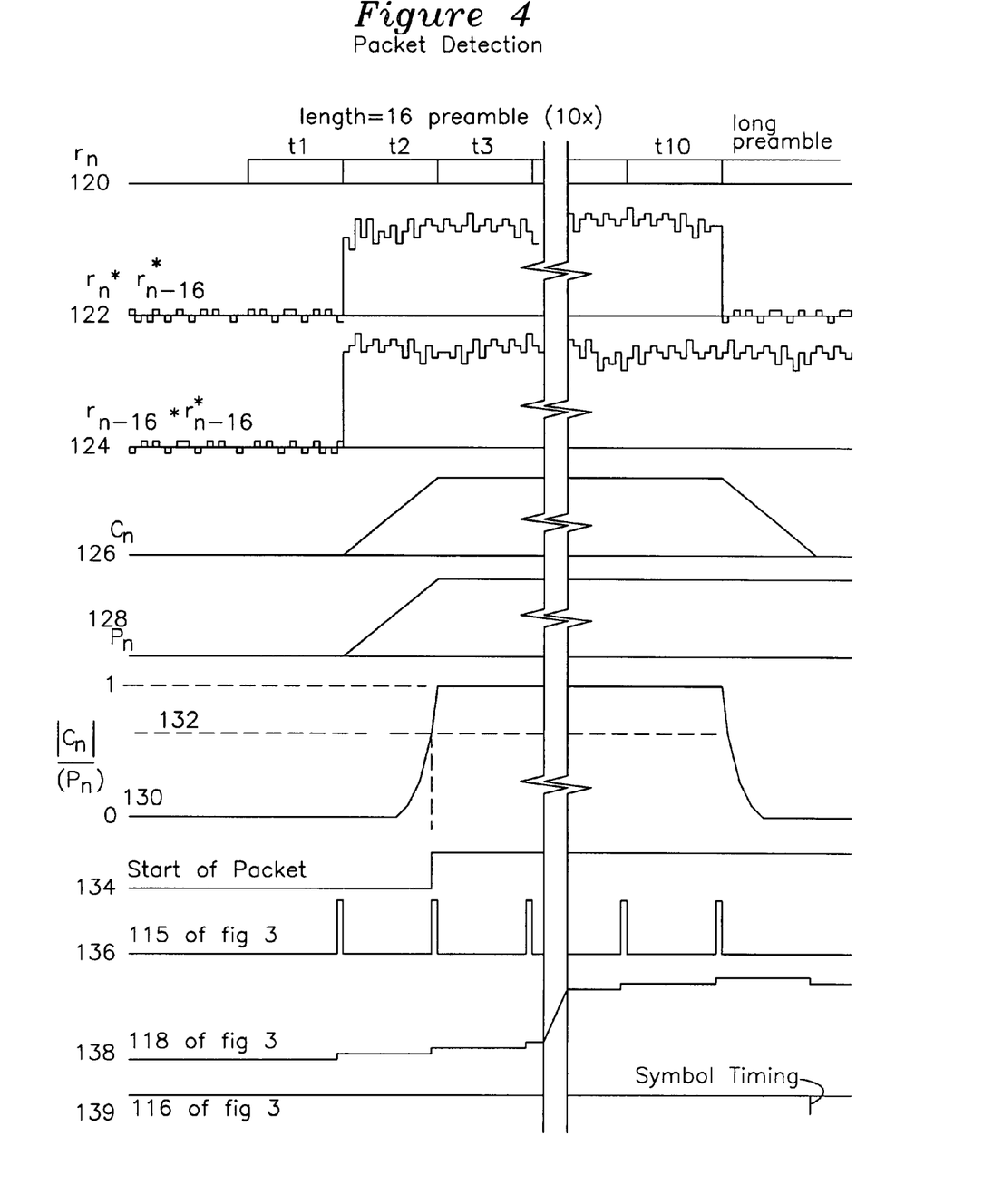
FIG. 4 shows the waveforms for the packet detection system of FIGS. 2 and 3.

FIG. 2 shows a prior art packet detection system 60 and a prior art frequency offset measurement system 40, while FIG. 3 shows a prior art symbol timing generator 100. These may be best understood in combination with the waveforms of FIG. 4. Packet detection is performed in FIG. 2 by examining a stream of complex OFDM symbols 92, as would be generated by the baseband detection of a modulated stream of OFDM symbols. One of the requirements of the demodulation system is to determine the start of the packet, which is asserted by packet detection signal 90. The incoming complex OFDM symbols 92 are delayed by one short preamble symbol interval L (shown for the case L=16) by delay element 62. A first multiplier 66 multiplies each incoming symbol from the incoming stream 92 (shown as stream 120 in FIG. 4) with a delayed and conjugated stream from conjugator 64. The modulation of OFDM symbols uses a cosine weighting function, which produces a real and imaginary component which is found in an OFDM symbol stream, and first multiplier 66 produces an output stream which is complex and has a large magnitude component, as shown in waveform 122 of FIG. 4. A sum of the previous sixteen symbols forming the correlation with the present symbol and previous symbols is performed in first summer 70, which produces the waveform 126 of FIG. 4, and the magnitude of this value is determined in absolute value 80, thereby producing a value 84 which is the absolute value of Cn, which is related to a running correlation of a current symbol with a previous symbol. When noise is entering the system, there is little or no correlation between these two intervals, and the output 74 has only noise level components. At the time the second preamble is received, the correlation is very high between the first preamble and second, as shown in waveform 122 of FIG. 4, and the first summer 70 accumulates an increasing value, which has a maximum value at the terminus of the second preamble t2 of FIG. 1, since the value is maximized at this point, as seen in waveform 126 of FIG. 4. The second multiplier 68 of FIG. 2 is simply finding the power of the previous symbol by multiplying the delay 62 output with a conjugate value generated by conjugator 64, which has the value of the signal plus noise power. The output of second multiplier 68 as shown by waveform 124 in FIG. 4 and represents the magnitude of the incoming signal regardless of correlation to previous symbols, while the output of the first multiplier 66 represents the magnitude of incoming signal which is correlated one short preamble time (shown for preamble length L=16) earlier. The first multiplier 66 output (waveform 122 of FIG. 4) tracks correlation and signal level, and the second multiplier output 68 (waveform 124 of FIG. 4) tracks signal level only. By finding the absolute value, or magnitude, of the output of the first summer 70 and generating $C_n$ 84 representing the correlated power, and dividing by $P_n$ 76, we may generate a packet detection function:

$$u = |C_n|/(P_n)$$

and when u is above a threshold level 132 as shown in waveform 130 of FIG. 4 as determined by comparator 88, we may assert packet detection signal 90, shown as waveform 134 of FIG. 4.

The coarse frequency offset estimation is performed by block 40 of FIG. 2. The incoming symbol stream is delayed and conjugated and multiplied together by multiplier 44 to generate an output which contains frequency offset equivalent constant phase offset, which is provided as an_input to a phase finder 46, which is a CORDIC (COordination Rotation DIgital Computer) function as is known to one skilled in the art. Phase finder 46 takes a complex-valued input and generates an output which is a phase value. Averaging the output of this phase finder generates an output which is the coarse frequency offset 50, however it can be shown that averaging 48 this output does not improve the noise rejection of the coarse frequency offset 50 in poor s/n conditions.

FIG. 3 shows a prior art symbol timing generator 100. Input complex OFDM symbol stream 92 as was applied to FIG. 2, is input to a tapped delay element 102 having a number of taps equal to the short preamble length (shown for preamble length L=16), which performs a cross correlation of incoming complex OFDM symbol stream 92 to a short preamble symbol 104 using multiplier 106 to multiply the moving OFDM stream against the fixed preamble symbols 104. The cross correlation contributions of each multiplication are summed in adder 108, which produces a cross correlation output stream 111 which is converted to a magnitude in absolute value function 113, which produces the output 115 shown as waveform 136 of FIG. 4, where each correlation between the incoming symbol stream and short symbol produce a correlation peak, as shown. This cross-correlation output stream 115 is fed to a second tapped delay element 110, where each delay is equal to the length of an entire short symbol (shown for L=16), such that the correlation peaks for all 10 short symbols are summed in adder 112. This results in the adder 112 output 118 increasing, shown as waveform 138 of FIG. 4, where each additional correlation peak causes the adder 112 output 118 to increase to a maximum at the final correlation peak, as shown. After the final correlation peak, the output 118 of the adder 112 begins to decrease, and this is detected by max peak finder 114, which generates the output 116 symbol timing pulse shown in waveform 139 of FIG. 4. In this manner, a prior art symbol timing output is generated.

There are several shortcomings of the prior art circuitry. While these system perform well in high signal to noise conditions, the operation in low signal to noise conditions is compromised. As the noise level of waveforms 122 and 124 of FIG. 4 increases, the values of Cn and Pn 126 and 128 become increasingly noisy, and when generate a function u which has a high level or rms noise, thereby causing the start of packet signal to become unreliable. Further, the cross-correlation output stream 117 of FIG. 3 is also effected by this noise, which results in generation of spurious symbol timing output 116.

It is desired to integrate the functions of symbol timing, packet detection, and coarse frequency offset measurement. It is also desired to provide an improved symbol timing signal which operates reliably in the presence of high levels of noise compared to prior art symbol timing and start of packet detectors.

OBJECTS OF THE INVENTION

A first object of the invention is an integrated packet detection, symbol timing, and coarse frequency offset estimator.

A second object of the invention is a system for packet detection.

A third object of the invention is a system for determination of symbol timing.

A fourth object of the invention is a system for determining symbol timing and packet detection using a variable first threshold.

SUMMARY OF THE INVENTION

An integrated coarse frequency measurement, packet detector, and symbol timing function receives as an input a stream of complex OFDM baseband symbols, as would be produced by baseband detection of an radio frequency (RF) OFDM symbol stream in a wireless packet, where the input stream includes a plurality of symbols from a short preamble, including a repeated short symbols. The input stream of complex OFDM symbols is correlated against a delayed version of itself, where the delay is equal to a short symbol. This is done by applying the input signal stream to a delay element having a number of taps equal to the number of samples in a short symbol, and the delay element thereby generates an output with a delay substantially equal to a short symbol duration. The output of this delay line is coupled to a conjugator which inverts the sign of imaginary component of the delayed signal and provides this to a first multiplier, which multiplies the conjugated and delayed symbol with a symbol one preamble time earlier. The first multiplier output is summed over the length of a short symbol, which produces a first summer output $C_n$, and the magnitude of this complex value is determined. This value is comparable to the correlated short preamble part of the signal, and also includes the magnitude of the received signal when the correlation between input and delayed input is high during the preamble interval. A second multiplier has an output which is formed by multiplying the input signal stream and its conjugate outputs together, thereby generating a magnitude of the present symbol. A complex symbol is of the form a+jb, so conjugating and multiplying this term produces the magnitude value $a^2+b^2$, which is summed over two preamble lengths to form a real value $P_n$, which is multiplied by a known threshold to produce a comparison threshold. A first comparator compares the value of absolute value of $C_n$ with the first threshold, and generates an output Packet Detect when the absolute value of $C_n$ is greater than the threshold value. A second comparator compares the value of absolute value of $C_n$ with the threshold value, and produces a symbol timing output when the value of absolute value of $C_n$ falls below the threshold value. In this manner, absolute value of $C_n$ rising above the first threshold signals packet detection, and absolute value of $C_n$ falling below this threshold indicates end of preamble, and start of symbol timing. A phase finder operating on the output of the first summer determines the coarse frequency offset by averaging the phase values of the complex stream leaving the first summer.

DETAILED DESCRIPTION OF THE INVENTION

Figure 5:
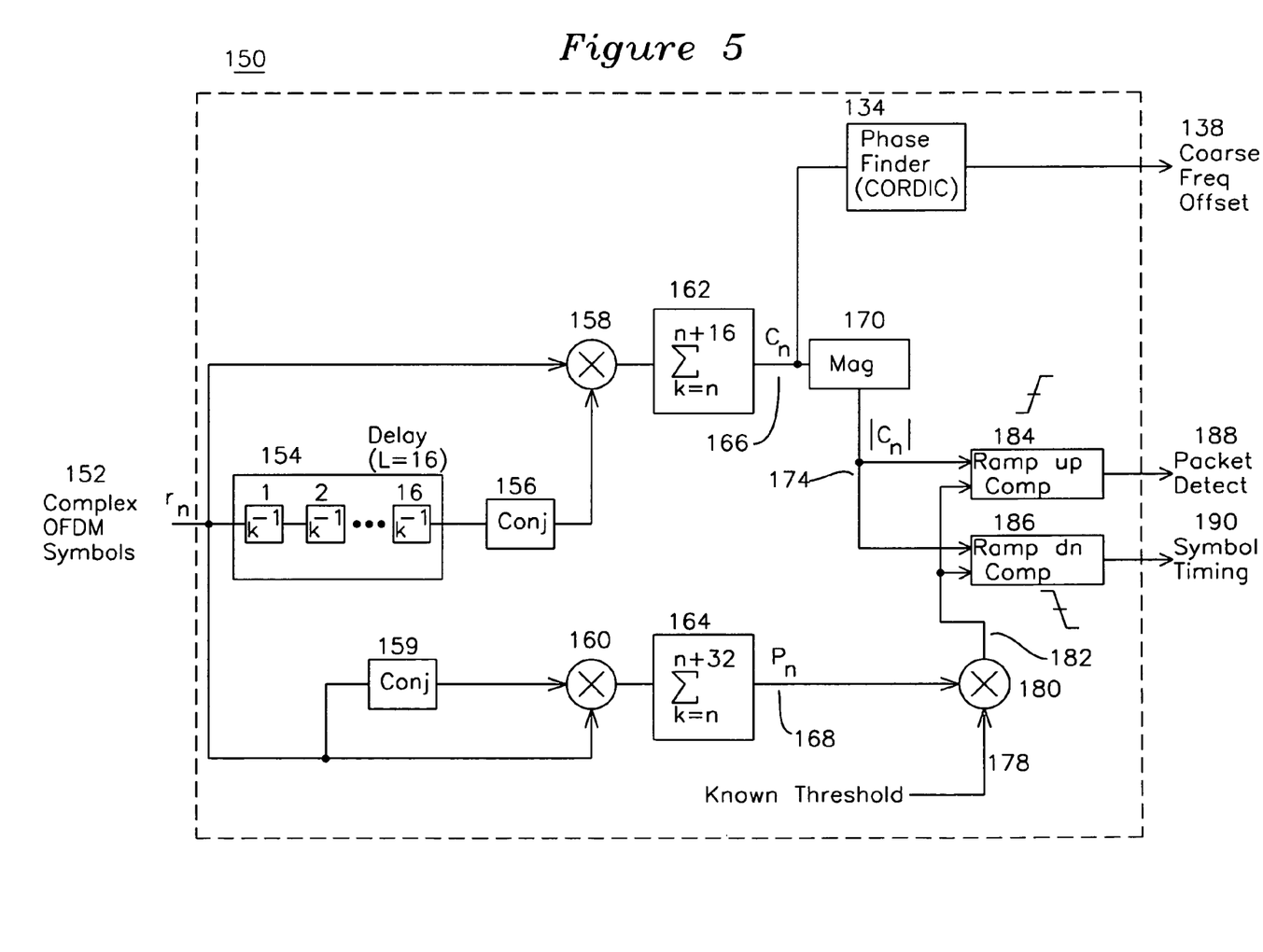
FIG. 5 shows the block diagram for a combined packet detection, symbol timing, and coarse frequency offset measurement.
Figure 6:
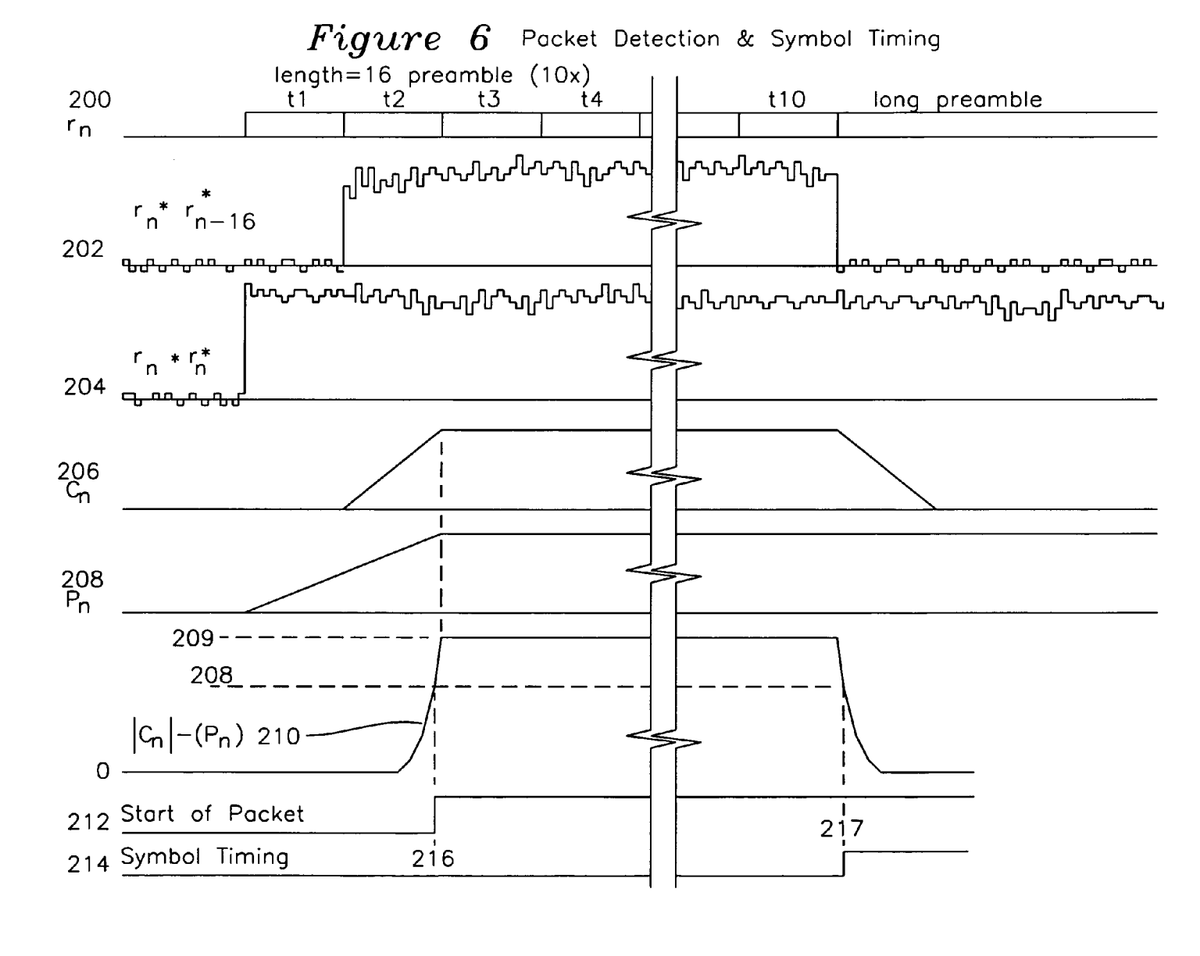
FIG. 6 shows the waveforms for the packet detection system of FIG. 5.

FIG. 5 shows an integrated coarse frequency offset measurement, packet detection, and symbol timing function processor 150, and may be best understood in combination with FIG. 6 showing the waveforms of operation. It is clear to one skilled in the art that these functions could be separated into individual functions, although the reuse of existing computed terms provides for reduced overall complexity when these functions are combined. An input stream of complex OFDM baseband symbols 152 such as results from baseband detection of an OFDM symbol stream and presented as stream 92 of FIGS. 2 and 3 is input to the processor 150. In a short preamble interval, such as shown as short preamble section 12 in FIG. 1, a repeating pattern of 16 samples comprises a short symbol, which is repeated 10 times during the short preamble section 12, also shown as waveform 200 of FIG. 6. Each incoming symbol is sampled and provided to a delay function 154 in FIG. 5, where the delay function has a number of storage elements L (shown for L=16) which is equal to the number of samples in a short symbol. The output of the delay element 154 is fed to conjugator 156, which reverses the sign of the imaginary part of the symbol, such that a+jb becomes a−jb. First multiplier 158 generates an output by multiplying the complex OFDM symbol input 152 with the delayed and conjugated complex output of conjugator 156, and the first multiplier 158 output is also shown in waveform 202 of FIG. 6. The second multiplier 160 generates an output by multiplying the input signal stream with its conjugate output of conjugator 159, thereby generating a value which represents the uncorrelated signal level, and is shown in waveform 204 of FIG. 6. The multiplication of a complex value a+bj and its conjugate a−bj produces the value $a^2+b^2$, and represents the uncorrelated signal level. The output of the second multiplier 160 is provided to second summer 164, which sums over an interval equal to two short symbol lengths (2L), thereby producing an output value $P_n$ 168 shown as waveform 208 of FIG. 6. The output $P_n$ 176 is multiplied by a known threshold 178 in multiplier 180 to generate a comparator threshold 182. The output of the first multiplier 158 is summed over a single symbol length L=16 to produce $C_n$ 166, also shown as waveform 206 of FIG. 6, and function 170 takes the magnitude of value $C_n$, which represents the correlated value of signal power over a short preamble interval of L=16 samples. The magnitude of $C_n$ is compared to the comparator threshold 182, and when it is greater than the comparator threshold, the ramp up comparator 184 asserts packet detect output 188, which indicates the start of the short preamble part of the OFDM packet, and when the short preamble period ends, the magnitude of $C_n$ 174 drops, thereby causing ramp down comparator 186 to assert the output symbol timing 190. This is also shown with relationship to the other signals in waveform 210 of FIG. 6, which is examined by ramp up comparator 184 against comparator threshold 182 shown as level 216 in FIG. 6, and generating start of packet waveform 212 at time 216, and symbol timing waveform 214 at time 217 when waveform 210 crosses below the threshold level 215. It is possible to combine the packet detect output 188 (waveform 212 of FIG. 6) and symbol timing output 190 (waveform 214 of FIG. 6) into a single waveform such that the rising edge of the packet detect output 130 of FIG. 4 indicates start of packet, and the falling edge indicates start of symbol timing 190. In this manner, the detection of a packet, and the reference datum used to provide symbol timing is provided using the processing of a single set of circuitry.

The phase finder 46 of FIG. 2 may be improved by coupling to the output of first summer 162 as shown in FIG. 5. Phase finder 134 may be implemented as a CORDIC as described earlier, and first summer 162 provides a reduced noise input to phase finder 134, thereby producing an improved estimate of coarse frequency offset 138 under poor s/n conditions compared to the prior art of FIG. 2. In this manner, an improved and integrated packet detection, symbol timing, and coarse frequency offset measurement system is described. While specific short preamble lengths are described, it is clear to one skilled in the art that the method is adaptable to any length of short preamble other than L=16, and it is adaptable to any OFDM receiving system which includes the transmission of two or more short preambles during a first preamble time.

We claim:

1. A system for the detection of data packets from a baseband signal where said baseband signal includes data packets which are encoded with symbols which use orthogonal frequency division multiplexing (OFDM), said packets include a short preamble part and a data part, said short preamble part being formed from a plurality of short symbols, each said short symbol comprising a pattern of L said samples, said detection of said data packets comprising:

said baseband signal coupled to a first delay line having a delay equal to the time required to receive said L samples, said delay line having an output;

a conjugator coupled to said delay line output, said conjugator inverting the sign of imaginary part of said delay line output;

a first multiplier having an output, said first multiplier output substantially equal to said baseband signal multiplied by said conjugator output;

a first summer having an output equal the sum of L previous said first multiplier output values;

a magnitude having an output which has a value equal to the magnitude of the output of said first summer;

a second multiplier having a real output, said second multiplier generating said output substantially equal to said baseband signal multiplied by the conjugate of baseband signal;

a second summer having an output equal to the to sum of twice said L previous said second multiplier output values;

a third multiplier having an output equal to said second summer output multiplied by a first baseline, said output forming a threshold value;

said packet detect output asserted when said magnitude output exceeds said threshold value.

2. The system of claim 1 where each said short symbol said L=16.

3. The system of claim 1 where each said short symbol includes 16 said OFDM samples.

4. The system of claim 1 where said short preamble comprises 10 said short symbols.

5. The system of claim 1 where said short preamble includes a long preamble following said plurality of short symbols.

6. The system of claim 1 where said first summer operates over 16 said samples of said short symbol.

7. The system of claim 1 where said second summer operates over two said short symbols.

8. The system of claim 1 where said known threshold is between 0.125 and 0.5 of the maximum output value produced by said second summer.

9. The system of claim 1 where said known threshold is 0.25 of the maximum output value produced by said second summer.

10. A system for the detection of symbol timing from a baseband signal where said baseband signal includes data packets which are encoded with symbols which use orthogonal frequency division multiplexing (OFDM), said packets include a short preamble part and a data part, said short preamble part being formed from a plurality of short symbols, each said short symbol comprising a pattern of L said samples, said detection of said data packets comprising:

said baseband signal coupled to a first delay line having a delay equal to the time required to receive said L samples, said delay line having an output;

a conjugator coupled to said delay line output, said conjugator inverting the sign of imaginary part of said delay line output;

a first multiplier having an output, said first multiplier generating an output from multiplying said baseband signal and said conjugator output;

a first summer having an output equal the sum of L previous said first multiplier output values;

a magnitude having an output which has a value equal to the magnitude of the output of said first summer;

a second multiplier having a real output, said second multiplier forming said real output by multiplying said baseband signal with the conjugate of said baseband signal;

a second summer having an output equal to the to sum of twice said L previous said second correlator output values;

a a third multiplier having an output equal to said second summer output multiplied by a first baseline, said output forming a threshold value;

said symbol timing output asserted when said magnitude square output falls below said threshold value.

11. The system of claim 10 where each said short symbols said L=16.

12. The system of claim 10 where each said short symbol includes 16 said OFDM samples.

13. The system of claim 10 where said short preamble comprises 10 said short symbols.

14. The system of claim 10 where said short preamble includes a long preamble following said plurality of short symbols.

15. The system of claim 10 where said first summer operates over 16 said samples of said short symbols.

16. The system of claim 10 where said second summer operates over two said short symbols.

17. The system of claim 10 where said known threshold is between 0.125 and 0.5 of the maximum output value produced by said second summer.

18. The system of claim 10 where said known threshold is 0.25 of the maximum output value produced by said second summer.

19. The system of claim 10 where said packet detection is indicated by one edge of an output signal and said symbol timing is indicated by a different edge of same said output signal.

20. A system for the estimation of coarse frequency offset from a baseband signal where said baseband signal includes data packets which are encoded with symbols which use orthogonal frequency division multiplexing (OFDM), said packets include a short preamble part and a data part, said short preamble part being formed from a plurality of short symbols, each said short symbol comprising a pattern of L said samples, said detection of said data packets comprising:

said baseband signal coupled to a first delay line having a delay equal to the time required to receive said L samples, said delay line having an output;

a conjugator coupled to said delay line output, said conjugator inverting the sign of imaginary part of said delay line output;

a multiplier having an output, said first multiplier output formed from the multiplication of said baseband signal and said conjugator output;

an averager coupled to said multiplier and producing an average of the output of said multiplier;

a phase finder for converting a complex value into an angle, said phase finder receiving as an input the output of said averager.

21. The system of claim 20 where said averager finds the average value of a previous 16 said multiplications.

22. The system of claim 20 where said phase finder converts a complex input value into an angular value.

23. The system of claim 20 where said phase finder is a CORDIC.

24. The system of claim 20 where said L is 16.

25. A system for the detection of symbol timing and packet detection from a baseband signal where said baseband signal includes data packets which are encoded with symbols which use orthogonal frequency division multiplexing (OFDM), said packets include a short preamble part and a data part, said short preamble part being formed from a plurality of short symbols, each said short symbol comprising a pattern of L said samples, said detection of said data packets comprising:

said baseband signal coupled to a first delay line having a delay equal to the time required to receive said L symbols, said delay line having an output;

a conjugator coupled to said delay line output, said conjugator inverting the imaginary part of said delay line output;

a first multiplier having an output, said first multiplier generating an output by multiplying said baseband signal and said conjugator output;

a first summer having an output equal the sum of L previous said first correlator output values;

a magnitude having an output which has a value equal to the magnitude of the output of said first summer;

a second multiplier having a real output, said second multiplier output formed from multiplying said baseband signal and the conjugate of said baseband signal;

a second summer having an output equal to the to sum of twice said L previous said second multiplier output values;

a third multiplier having an output equal to said second summer output multiplied by a first baseline, said output forming a threshold value;

said packet detect output asserted when said magnitude square output rises above said threshold value;

said symbol timing output asserted when said magnitude square output falls below said threshold value.

26. The system of claim 25 where each said short symbol said L=16.

27. The system of claim 25 where each said short symbol includes 16 said OFDM samples.

28. The system of claim 25 where said short preamble comprises 10 said short symbols.

29. The system of claim 25 where said short preamble includes a long preamble following said plurality of short symbols.

30. The system of claim 25 where said first summer operates over 16 said samples of said short symbol.

31. The system of claim 25 where said second summer operates over two said short symbols.

32. The system of claim 25 where said known threshold is between 0.125 and 0.5 of the maximum output value produced by said second summer.

33. The system of claim 25 where said known threshold is 0.25 of the maximum output value produced by said second summer.

34. The system of claim 25 where said packet detection is indicated by one edge of an output signal and said symbol timing is indicated by a different edge of same said output signal.

\* \* \* \* \*